United States Patent
El-Moussa et al.

(10) Patent No.: US 10,719,346 B2
(45) Date of Patent: Jul. 21, 2020

(54) DISK ENCRYPTION

(71) Applicant: British Telecommunications Public Limited Company, London (GB)

(72) Inventors: Fadi El-Moussa, London (GB); Theo Dimitrakos, London (GB)

(73) Assignee: British Telecommunications Public Limited Company, London (GB)

( * ) Notice: Subject to any disclaimer, the term of this patent is extended or adjusted under 35 U.S.C. 154(b) by 173 days.

(21) Appl. No.: 16/073,424

(22) PCT Filed: Jan. 26, 2017

(86) PCT No.: PCT/EP2017/051613
§ 371 (c)(1),
(2) Date: Jul. 27, 2018

(87) PCT Pub. No.: WO2017/129659
PCT Pub. Date: Aug. 3, 2017

(65) Prior Publication Data
US 2019/0050247 A1 Feb. 14, 2019

(30) Foreign Application Priority Data
Jan. 29, 2016 (EP) ..................... 16153534

(51) Int. Cl.
*G06F 9/46* (2006.01)
*G06F 9/455* (2018.01)
(Continued)

(52) U.S. Cl.
CPC ............ *G06F 9/45558* (2013.01); *G06F 8/63* (2013.01); *G06F 9/4856* (2013.01); *G06F 21/53* (2013.01);
(Continued)

(58) Field of Classification Search
CPC ...... G06F 9/45558; G06F 8/63; G06F 9/4856; G06F 21/53; G06F 21/602; G06F 21/8218
See application file for complete search history.

(56) References Cited

U.S. PATENT DOCUMENTS

| 8,214,584 B2 | 7/2012 | Johnson |
| 8,572,410 B1 | 10/2013 | Tkacik et al. |

(Continued)

FOREIGN PATENT DOCUMENTS

| EP | 2 645 618 A1 | 10/2013 |
| WO | WO 2013/091221 A1 | 6/2013 |
| WO | WO 2017/129657 A1 | 8/2017 |

OTHER PUBLICATIONS

U.S. Appl. No. 16/073,363, filed Jul. 27, 2018, Inventor(s): El-Moussa et al.

(Continued)

*Primary Examiner* — Camquy Truong
(74) *Attorney, Agent, or Firm* — Patterson Thuente Pedersen, P.A.

(57) ABSTRACT

A computer implemented method of providing whole disk encryption for a virtualized computer system including providing a software component executing in a first virtual machine for instantiation in a first hypervisor, the software component invoking a second hypervisor within the first virtual machine for instantiating a disk image of the virtualized computer system as a second virtual machine, and the software component being configured to install a software agent in the second virtual machine, the software agent being adapted to: a) encrypt the instantiated disk image; b) encrypt data written, by the second virtual machine, to the instantiated disk image at a runtime of the second virtual machine; and c) decrypt data read, by the second virtual machine, from the instantiated disk image at a runtime of the (Continued)

second virtual machine, wherein the software component is configured to migrate the second virtual machine at a runtime of the second virtual machine to the first hypervisor so as to provide a wholly encrypted disk image for the second virtual machine executing in the first hypervisor.

8 Claims, 6 Drawing Sheets

(51) Int. Cl.

| | |
|---|---|
| *G06F 8/61* | (2018.01) |
| *G06F 21/53* | (2013.01) |
| *G06F 21/62* | (2013.01) |
| *G06F 9/48* | (2006.01) |
| *G06F 21/60* | (2013.01) |
| *H04L 29/06* | (2006.01) |

(52) U.S. Cl.
CPC ........ *G06F 21/602* (2013.01); *G06F 21/6218* (2013.01); *H04L 63/06* (2013.01); *G06F 2009/4557* (2013.01); *G06F 2009/45562* (2013.01); *G06F 2009/45566* (2013.01); *G06F 2221/2107* (2013.01)

(56) References Cited

U.S. PATENT DOCUMENTS

| | | | |
|---|---|---|---|
| 8,977,842 | B1 | 3/2015 | McCorkendale et al. |
| 9,141,303 | B2 | 9/2015 | Kishi et al. |
| 9,189,609 | B1 | 11/2015 | Antony |
| 2005/0235143 | A1 | 10/2005 | Kelly |
| 2006/0161982 | A1 | 7/2006 | Chari et al. |
| 2008/0022385 | A1 | 1/2008 | Crowell et al. |
| 2008/0263372 | A1 | 10/2008 | Sako et al. |
| 2009/0113109 | A1 | 4/2009 | Nelson et al. |
| 2009/0222631 | A1 | 9/2009 | Sugiura |
| 2011/0072428 | A1 | 3/2011 | Day, II et al. |
| 2011/0153909 | A1 | 6/2011 | Dong |
| 2011/0231671 | A1 | 9/2011 | Locker et al. |
| 2011/0271073 | A1 | 11/2011 | Ikeda et al. |
| 2011/0296197 | A1 | 12/2011 | Konetski et al. |
| 2012/0036370 | A1 | 2/2012 | Lim et al. |
| 2012/0042034 | A1 | 2/2012 | Goggin et al. |
| 2012/0066681 | A1 | 3/2012 | Levy et al. |
| 2012/0117381 | A1 | 5/2012 | Lo et al. |
| 2012/0297189 | A1 | 11/2012 | Hayton et al. |
| 2013/0097421 | A1 | 4/2013 | Lim |
| 2013/0191648 | A1 | 7/2013 | Bursell |
| 2013/0212709 | A1 | 8/2013 | Tucker |
| 2013/0243197 | A1 | 9/2013 | Sherwood et al. |
| 2013/0247056 | A1 | 9/2013 | Hattori et al. |
| 2013/0283367 | A1* | 10/2013 | Tokunaga ............... G06F 21/62 726/16 |
| 2014/0019968 | A1 | 1/2014 | Deng et al. |
| 2014/0149666 | A1 | 5/2014 | Nakagawa et al. |
| 2014/0208111 | A1 | 7/2014 | Brandwine et al. |
| 2014/0282539 | A1 | 9/2014 | Sonnek |
| 2014/0380035 | A1 | 12/2014 | Marinelli et al. |
| 2015/0149999 | A1 | 5/2015 | Ramanathan et al. |
| 2016/0048676 | A1 | 2/2016 | Eidus et al. |
| 2016/0188353 | A1 | 6/2016 | Shu et al. |
| 2017/0288863 | A1 | 10/2017 | Dimitrakos et al. |
| 2017/0288871 | A1 | 10/2017 | Dimitrakos et al. |
| 2019/0034218 | A1 | 1/2019 | El-Moussa et al. |
| 2019/0034645 | A1 | 1/2019 | El-Moussa et al. |

OTHER PUBLICATIONS

U.S. Appl. No. 16/073,453, filed Jul. 27, 2018, Inventor(s): El-Moussa et al.

Application and Filing Receipt for U.S. Appl. No. 16/073,396, filed Jul. 27, 2018, Inventor(s): El-Moussa et al.
Application and Filing Receipt for U.S. Appl. No. 15/507,840, filed Mar. 1, 2017, Inventor(s): Dimitrakos et al.
International Search Report and Written Opinion for PCT Application No. PCT/EP2017/051610 dated Mar. 31, 2017; 8 pages.
International Search Report and Written Opinion for PCT Application No. PCT/EP2017/051614 dated Mar. 31, 2017; 8 pages.
International Search Report and Written Opinion for PCT Application No. PCT/EP2017/051339 dated Mar. 31, 2017; 10 pages.
Bragg, Robert; The Encrypting File System, "How EFS Works" [retrieved on Jul. 26, 2018]; https://technet.microsoft.com/en-us/library/cc700811.aspx#mainSection 14 pages.
International Search Report and Written Opinion for PCT Application No. PCT/EP2015/071773 dated Oct. 26, 2015; 8 pages.
International Preliminary Report on Patentability for Application No. PCT/EP2015/071773, dated Apr. 6, 2017, 7 pages.
International Preliminary Report on Patentability for Application No. PCT/EP2017/051339, dated Aug. 9, 2018, 8 pages.
International Preliminary Report on Patentability for Application No. PCT/EP2017/051610, dated Aug. 9, 2018, 7 pages.
International Preliminary Report on Patentability for Application No. PCT/EP2017/051613, dated Aug. 9, 2018, 8 pages.
International Preliminary Report on Patentability for Application No. PCT/EP2017/051614, dated Aug. 9, 2018, 7 pages.
Zhang et al: "CloudVisor: Retrofitting Protection of Virtual Machines in Multi-tenant Cloud with Nested Virtualization"; Oct. 23, 2011 (Oct. 23, 2011). pp. 203-216. XP058005755. DOI: 10.1145/2043556. 2043576 ISBN: 978-1-4503-0977-6; 14 pages.
Muller, et al.: TreVisor "OS-Independent Software-Based Full Disk Encryption Secure against Main Memory Attacks" Department of Computer Science Friedrich-Alexander University of Erlangen-Nuremberg F. Bao, P. Samarati, and J. Zhou (Eds.): ACNS 2012, LNCS 7341, pp. 66-83, 2012. Springer-Verlag Berlin Heidelberg 2012; Jun. 26, 2012 (Jun. 26, 2012). pp. 66-83. XP055284332. ISBN: 978-3-642-31284-7; https://mirror.robert-marquardt.comjdownloadsjtrevisor.pdf ; 18 pages.
International Search Report for corresponding International Application No. PCT/EP2017/051613 dated Apr. 20, 2017; 4 pages.
Written Opinion of the International Searching Authority for corresponding International Application No. PCT/EP2017/051613 dated Apr. 20, 2017; 6 pages.
VMware vSphere Storage; Update 1; Modified Jul. 12, 2018; VMware vSphere 6.0 VMware ESXi 6.0 vCenter Server 6.0; VMware, Inc. 3401 Hillview Ave. Palo Alto, CA 94304 Copyright © 2009-2018; https://docs.vmware.com/; 315 pages.
Popek et al., "Formal Requirement for Virtualizable Third Generation Architectures"; University of California, Los Angeles; Communications of the AMC; Jul. 1974, vol. 17, No. 7; 10 pages.
Hunt et al; "Detours: Binary Interception of Win32 Functions"; Microsoft Research One Microsoft Way Redmond, WA 98052; Published in Proceedings of the 3rd USENIX Windows NT Symposium. Seattle, WA, Jul. 1999; http://research.microsoft.com/sn/detours; 9 pages.
Bremer; Intercepting System Calls on x86_64 Windows; May 15, 2012; Intercepting System Calls on x86_64 Windows | Development & Security; [retrieved Jul. 26, 2018]; http://jbremer.org/intercepting-system-calls-on-x86_64-windows/ 9 pages.
Seung-Woo Kim (Intel); Intercepting System API Calls | Intel® Software (https://software.intel.com/en-us/user/336519), published on Mar. 7, 2012; 13 pages.
Myers et al., University of Maryland; Intercepting Arbitrary Functions on Windows, UNIX, and Macintosh OS X Platforms CS-TR-4585, UMIACS-TR-2004-28; Center for Bioinformatics and Computational Biology Institute for Advanced Computer Studies, University of Maryland, MD 20742 USA CS-TR-4585, UMIACS-TR-2004-28.

* cited by examiner

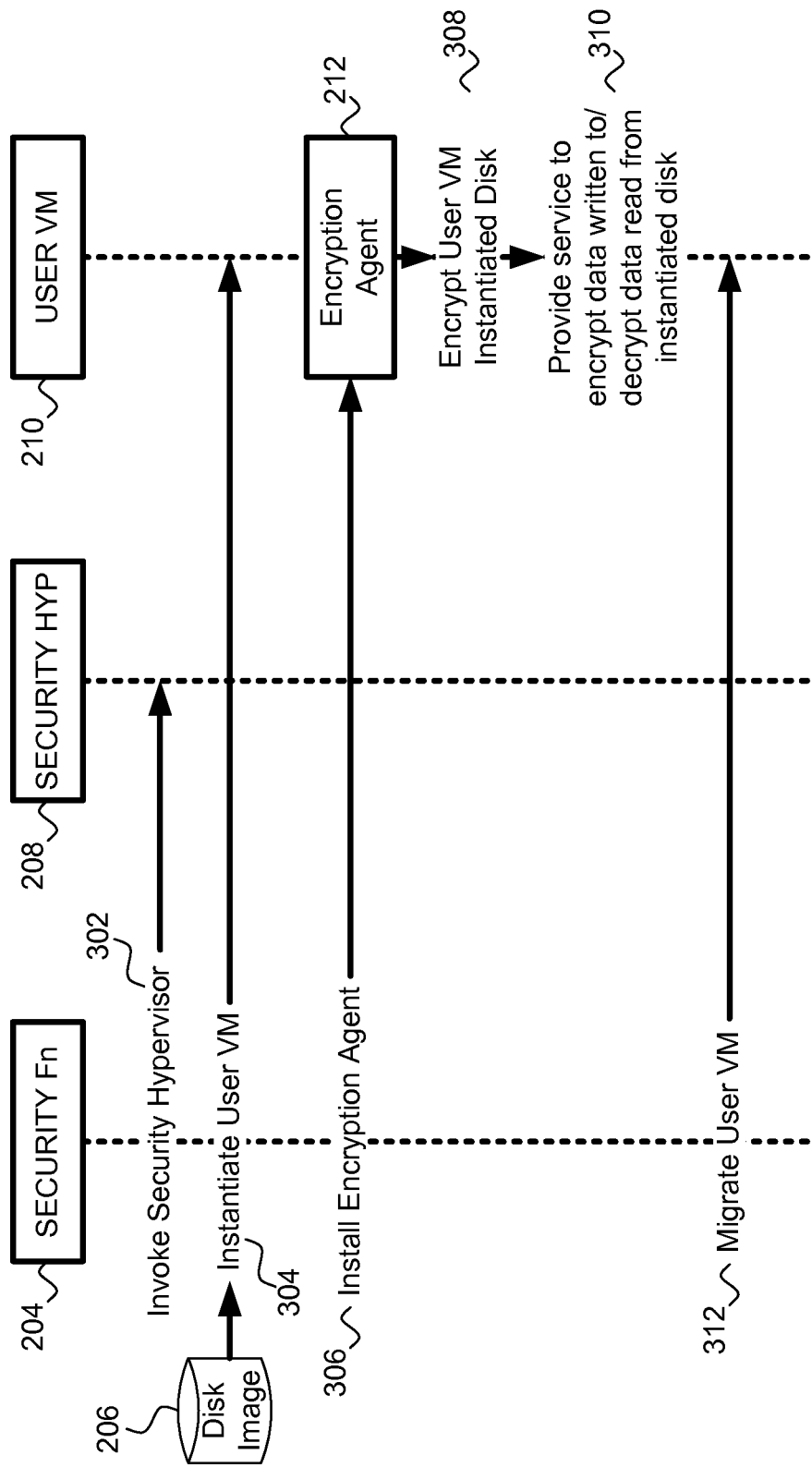

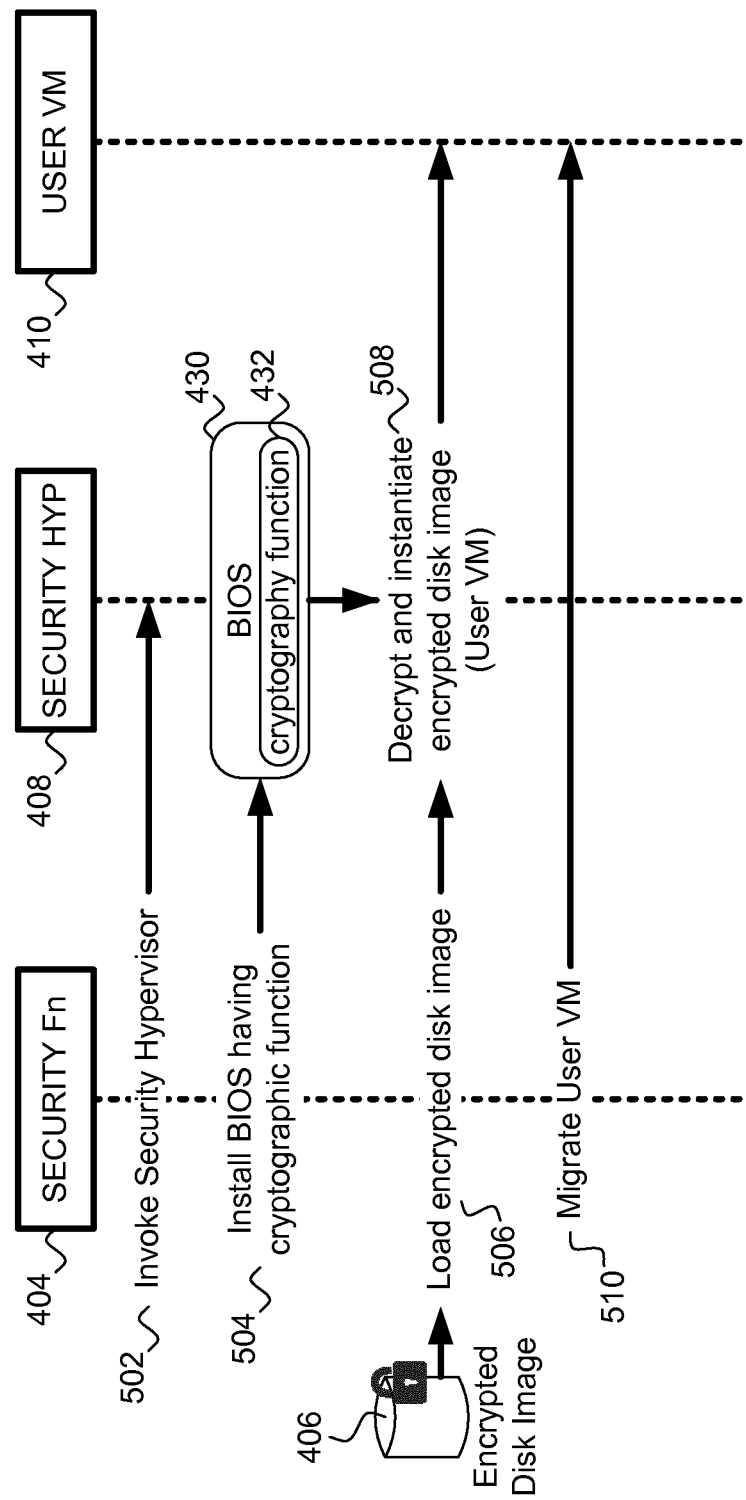

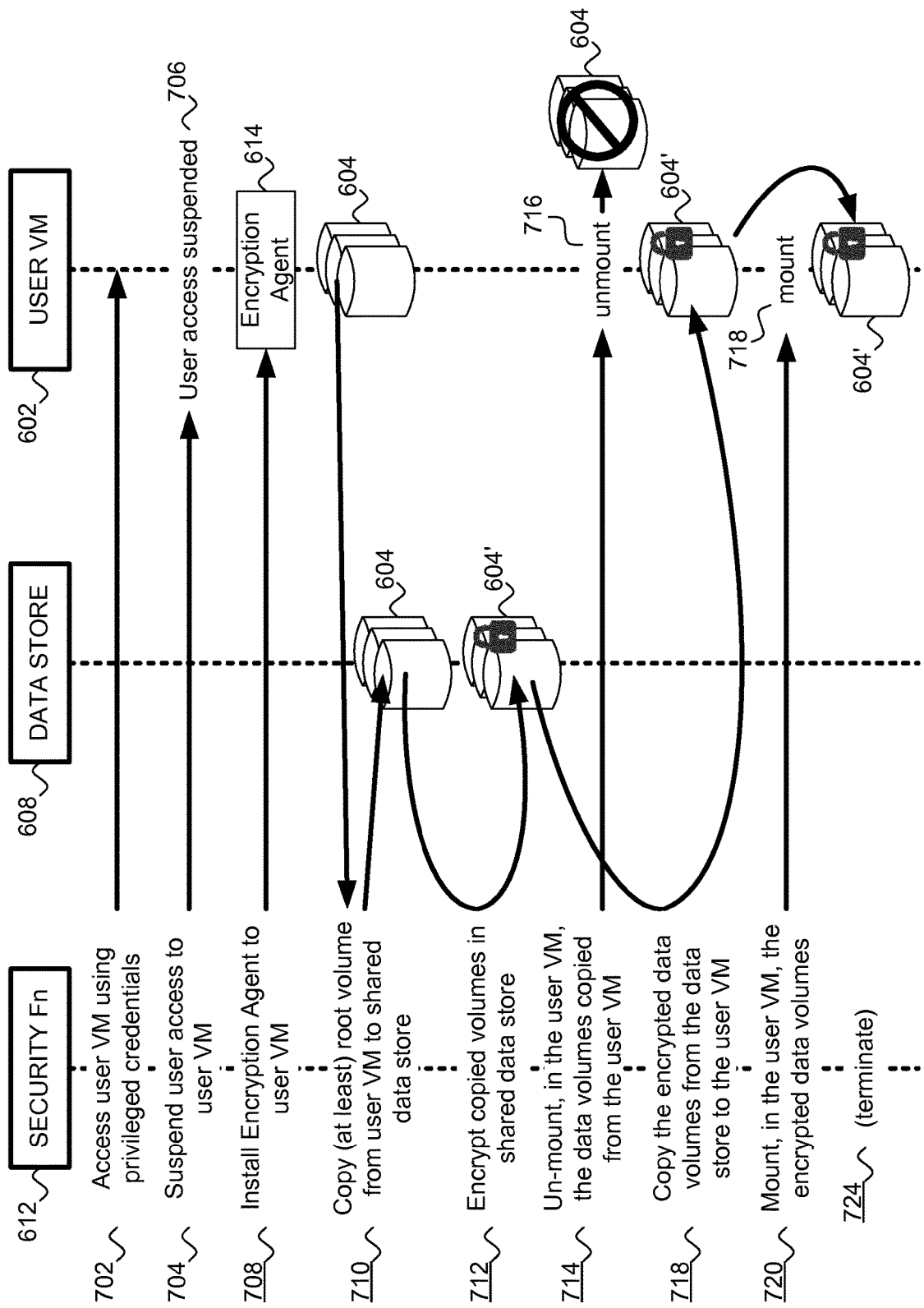

DISK ENCRYPTION

CROSS-REFERENCE TO RELATED APPLICATION

The present application is a National Phase entry of PCT Application No. PCT/EP2017/051613, filed Jan. 26, 2017, which claims priority from EP Patent Application No. 16153534.9, filed Jan. 29, 2016, each of which is hereby fully incorporated herein by reference.

TECHNICAL FIELD

The present disclosure relates to encrypted data storage disks. In particular, the disclosure relates to whole disk encryption.

BACKGROUND

Data encryption is employed to secure data against unauthorized access. For example, data stored in a file system of a computer system can be encrypted such that unauthorized users accessing the file are unable to decrypt the file without one or more requisite cryptographic keys. Whole disk encryption (WDE)—also known as full disk encryption (FDE)—is a technique for encrypting data stored on a data storage disk in "rest" state to protect against access to the disk by an unauthorized user or theft of the disk while it is not in use. Such a disk can include a physical disk or a virtual disk resource provided in a virtualized computing environment. Where a whole disk is encrypted it is difficult for an attacker to make sense of data stored on the disk due to the encryption. Whole disk encryption is one of the most common ways organizations protect their data from theft or loss.

WDE solutions operate on both physical computer systems with physical disks and virtualized computer systems with potentially virtualized data storage disk such as cloud computing platforms. Approaches to WDE are generally based on a "pre-boot" scheme that applies before bootstrapping of an operating system on a physical or virtualized computer system. Specialized encryption software is installed in a portion of a disk used to bootstrap the operating system such as a portion of the disk containing an operating system bootloader. The location of the encryption software varies in different solutions: some solutions employ a Master Boot Record (MBR) as a first sector of a disk; alternative solutions create a dedicated partition and install the encryption software there. For example, the SecureCloud service provided by TREND MICRO requires at least 100 MB of free storage on a boot partition of a disk in order to install its encryption agent software.

The encryption software used in WDE encrypts all partitions selected for encryption on a disk except for that part of the disk storing the encryption software itself (such as an MBR or such dedicated partition). It is not possible for the WDE encryption software to encrypt the part of the disk storing itself because so doing will prevent the computer from bootstrapping since the bootstrap or bootloader itself will be encrypted. Thus in WDE a computer boots from the MBR or un-encrypted partition and the encryption software decrypts and loads the operating system from an encrypted partition.

Accordingly, despite its name, WDE is not actually the encryption of a whole disk where an operating system bootstrap or bootloader is required on the disk. There is therefore a part of a disk that is retained unencrypted so that the encryption software itself can be loaded and executed. This unencrypted portion of the disk constitutes a vulnerability that can be exploited by attacks such as the "bootkit" attack in which an MBR or boot sector of an unencrypted part of a disk is infected with malicious software to tamper with the boot process of a computer, or even to simply passively await a user input of a decryption PIN, key or passphrase and capture such information to access a decryption key that will be loaded in the computer memory.

SUMMARY

Thus there is a need to address the considerable disadvantages of the known techniques to provide for the secure storage of data in a computer system by whole disk encryption without the aforementioned disadvantages.

The present disclosure accordingly provides, in a first aspect, a computer implemented method of providing whole disk encryption for a virtualized computer system comprising: providing a software component executing in a first virtual machine for instantiation in a first hypervisor, the software component invoking a second hypervisor within the first virtual machine for instantiating a disk image of the virtualized computer system as a second virtual machine, and the software component being configured to install a software agent in the second virtual machine, the software agent being adapted to: a) encrypt the instantiated disk image; b) encrypt data written, by the second virtual machine, to the instantiated disk image at a runtime of the second virtual machine; and c) decrypt data read, by the second virtual machine, from the instantiated disk image at a runtime of the second virtual machine, wherein the software component is configured to migrate the second virtual machine at a runtime of the second virtual machine to the first hypervisor so as to provide a wholly encrypted disk image for the second virtual machine executing in the first hypervisor.

In some embodiments, the software component is further configured to access one or more cryptographic keys for the encryption and decryption from a key management server and to provide the key(s) to the software agent.

In some embodiments, the migration is a live migration such that the second virtual machine transfers from executing in the second hypervisor to executing in the first hypervisor with continuing operation for users of the second virtual machine.

In some embodiments, the second virtual machine executing in the second hypervisor is a source virtual machine and the live migration includes: copying a disk image for the source virtual machine to a new virtual machine instantiated in the first hypervisor as a target virtual machine; maintaining a synchronization of a state of the target virtual machine with a state of the source virtual machine; transitioning users of the source virtual machine to the target virtual machine; and ceasing execution of the source virtual machine such that the target virtual machine constitutes the second virtual machine migrated to the first hypervisor.

In some embodiments, the method further comprises terminating the second hypervisor on completion of the migration.

In some embodiments, the method further comprises terminating the first virtual machine on completion of the migration.

The present disclosure accordingly provides, in a second aspect, a data processing system to provide whole disk encryption for a virtualized computer system, the data processing system comprising a processor and a data store, wherein the processor is adapted to provide a software component executing in a first virtual machine for instantiation in a first hypervisor, the software component invoking a second hypervisor within the first virtual machine for instantiating a disk image of the virtualized computer system as a second virtual machine, and the software component being configured to install a software agent in the second virtual machine, the software agent being adapted to: a) encrypt the instantiated disk image; b) encrypt data written, by the second virtual machine, to the instantiated disk image at a runtime of the second virtual machine; and c) decrypt data read, by the second virtual machine, from the instantiated disk image at a runtime of the second virtual machine, wherein the software component is configured to migrate the second virtual machine at a runtime of the second virtual machine to the first hypervisor so as to provide a wholly encrypted disk image for the second virtual machine executing in the first hypervisor.

The present disclosure accordingly provides, in a fifth aspect, a computer program element comprising computer program code to, when loaded into a computer system and executed thereon, cause the computer to perform the method set out above.

BRIEF DESCRIPTION OF THE DRAWINGS

Embodiments of the present disclosure will now be described, by way of example only, with reference to the accompanying drawings, in which:

FIG. 3 is a flow diagram of a method of providing WDE for a virtualized computer system in accordance with an embodiment of the present disclosure.

FIG. 5 is a flow diagram of a method of instantiating an encrypted disk image for a virtualized computer system in accordance with an embodiment of the present disclosure.

FIG. 7 is a flow diagram of a method of providing WDE for a virtualized computer system in accordance with an embodiment of the present disclosure.

DESCRIPTION

Embodiments of the present disclosure overcome the aforementioned disadvantages of WDE in virtualized computing environments in which virtualizations of computing devices are provided as virtual machines (VMs) to execute on potentially distributed physical computing hardware under the control of hypervisor software. A hypervisor or virtual machine monitor (VMM) is a piece of computer software, firmware or hardware that creates and executes VMs. One or more computer systems on which a hypervisor is running one or more VMs is referred to as a host machine. Each executing VM is typically referred to as a guest machine. Software executing in a VM can include a complete software implementation of a computer system including operating systems, software services, middleware, databases and applications. Hypervisors typically provide VMs with real or emulated computing resources including data storage resources, input/output resources, networking, processors, memory and the like. Hypervisors can include a data store that is a physical or virtual storage resource for the storage of data. The hypervisor data store can be provided for access by one or more VMs executing in the hypervisor such that the data store can be shared between potentially multiple VMs. An example of such a data store can be provided by vSphere Storage for VMWARE hypervisors (as documented in the 2015 VMWARE document "vSphere Storage, ESXI 6.0, vCenter Server 6.0", accessible from pubs.vmware.com/vsphere-0/topic/com.vmware.ICbase/PDF/vsphere-esxi-vcenter-server-60-storage-guide.pdf).

A software installation for a VM can manifest an image of a data storage disk device that is instantiated in a virtualization of a requisite hardware environment. Accordingly, WDE applied to a virtualized computer system such as a VM involves encrypting a disk image for the VM. However, encryption of an entire disk image suffers the aforementioned problems that the VM would not be bootable because a bootstrap or bootloader portion of the disk is encrypted and not accessible. Embodiments of the present disclosure mitigate this challenge.

Figure 1:
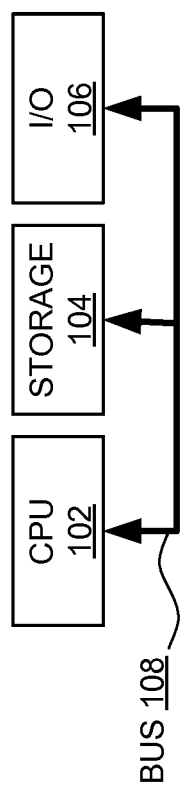
FIG. 1 is a block diagram of a computer system suitable for the operation of embodiments of the present disclosure.

FIG. 1 is a block diagram of a computer system suitable for the operation of embodiments of the present disclosure. A central processor unit (CPU) 102 is communicatively connected to a storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2A:
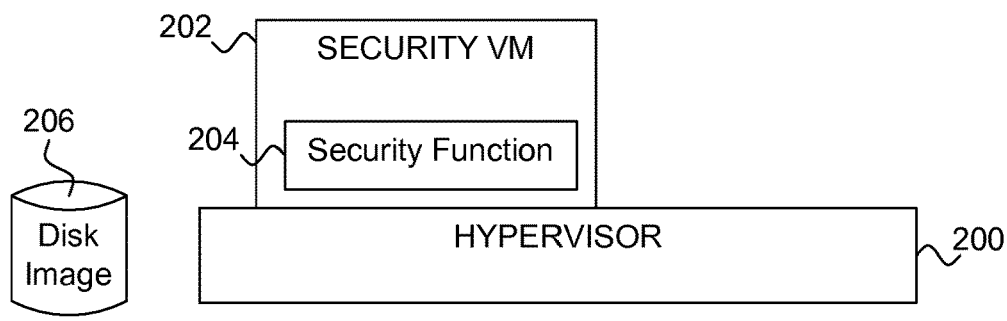
FIGS. 2a, 2b and 2c are schematic illustrations of a security virtual machine (VM) in accordance with an embodiment of the present disclosure.
Figure 2B:
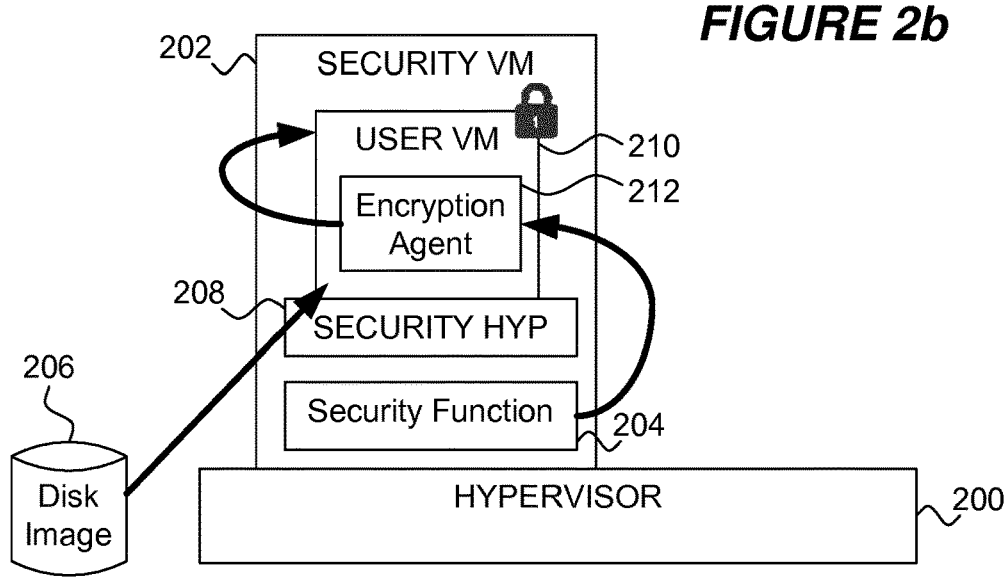
Figure 2C:
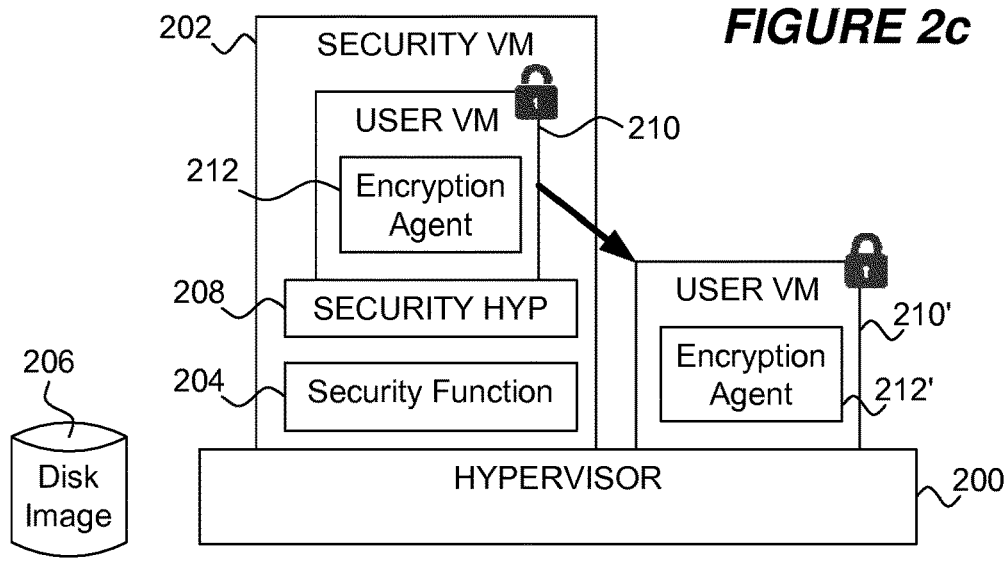

FIGS. 2a, 2b and 2c are schematic illustrations of a security VM in accordance with an embodiment of the present invention. Starting with FIG. 2a a security VM 202 is a VM instantiated to execute on a hypervisor 200. The hypervisor 200 is a software, hardware, firmware or combination component for the creation of VMs such as by instantiating VM images. The hypervisor 200 can be of any suitable type such as a Type-1 or Type-2 hypervisor as defined by Gerald J. Popek and Robert P. Goldberg in their paper "Formal Requirements for Virtualizable Third Generation Architectures" (1974).

The security VM 202 is so-called because it implements several of the security features in accordance with an embodiment of the present invention as will be described below. For example, the security VM 202 is a VM executing in a VMWARE hypervisor, such as a MICROSOFT WINDOWS based VM or a Linux based VM. The security VM 202 includes a security function 204 as a software component providing security services in accordance with an embodiment of the present disclosure. The security function is a software component such as a software service, application, driver, library, script(s) or the like for executing or triggering the execution of a second hypervisor, referred to herein as a security hypervisor 208 for its use in providing security features in accordance with an embodiment of the present invention. As illustrated in FIG. 2b, the security hypervisor 208 is executed within the security VM 202 such as a hypervisor suitable for executing in a windows environment executing in a WINDOWS VM, or other such suitable arrangements as will be apparent to those skilled in the art.

A disk image 206 is also provided as a data structure, data stream or file including a representation of a disk storage device such as a virtual disk containing an installation of software required for the load and execution of a virtual machine. The disk image 206 is at least partially unencrypted such that the disk image is susceptible to theft or attack. For example the disk image 206 is a VMWARE VM Disk (VMDK) as a file of a particular format that describes containers for virtual hard disk drives to be used to instantiate VMs in hypervisors such as VMWARE Workstation or VirtualBox. In one embodiment the disk image 206 includes data corresponding to a virtual disk storage device containing an installed and bootable operating system such as MICROSOFT WINDOWS and having installed thereon device drivers, services, system libraries and possibly applications software to constitute a VM when instantiated for execution in a hypervisor. Instantiation of a VM refers to the generation of an instance of a VM based on, for example, a disk image for the VM by way of a hypervisor. A VM requires a virtualization of a computing environment including computing resources and facilities that are provided, emulated or simulated by a hypervisor. Instantiation is based on a definition of requirements for resources (such as memory, processor(s), networking, storage and the like) expressed in, or in association with, a disk image file to provide concrete instances of resources by or with the hypervisor to provide a VM. Thus the disk image 206 is suitable for instantiation as a VM, referred to herein as a user VM 210.

Accordingly, as illustrated in FIG. 2b, the security function 204 causes the security hypervisor 208 to instantiate the user VM 210 on the basis of the disk image 206 such that the user VM 210 executes within the security VM 202 by way of the security hypervisor 208.

The security function 204 further installs a software agent, referred to herein as encryption agent 212, into the executing user VM 210. The encryption agent 212 is a software routine executing with an operating system of the user VM 210 to provide encryption and decryption functions for data storage devices of the user VM 210. For example, the encryption agent 212 is a service, device driver or other suitable software component. The function of the encryption agent 212 can be considered in two parts.

Firstly, the encryption agent 212 is operable to encrypt the data storage devices of the user VM 210 in order that the entire data storage for the user VM 210 is encrypted. Thus, a disk image of the user VM 210 after encryption of the data storage devices by the encryption agent 212 is a wholly encrypted disk image including encryption of partitions for booting an operating system of the user VM 210 and/or a MBR of the user VM 210.

Secondly, the encryption agent 212 is operable to encrypt data stored to data storage devices of the user VM 210 and decrypt data retrieved from data storage devices of the user VM 210. In this way the user VM 210 in execution, including applications and services executing therein, is able to read and write to the data storage devices of the user VM 210 while retaining a wholly encrypted disk image of the user VM 210.

In providing the encryption agent 212, the security function 204 can cooperate with, communicate with or otherwise operate with a source of cryptographic information such as cryptographic keys including symmetric and/or asymmetric keys for the provision of the encryption and decryption functions of the encryption agent 212. For example, in one embodiment the security function 204 communicates with a key management server or the like which may be local or remote to the hypervisor 200. Alternatively the security function or additional software (not shown) can manage cryptographic keys and/or encryption algorithms employed. In a further alternative, the encryption agent is operable to communicate with a key management server or the like to obtain the required cryptographic resources.

Data storage devices of a user VM 210 include virtualized data storage devices for the storage of software and data and include all aspects of a virtualized storage device such as a virtual disk device including data storage devices such as an MBR, logical and virtualized physical partitions, boot partitions, primary and secondary partitions, special reserved areas of disk for system, boot or other functions and the like. Thus, typically a disk image 206 for a VM will include a plurality for storage devices (e.g. an MBR and a primary partition, or a boot partition, a primary partition and one or more secondary partitions, and many other arrangements as will be apparent to those skilled in the art). However, the references herein to data storage devices (plural) for user VM 210 should not preclude an environment where the user VM 210 includes, contains or is contained within a single data storage device such as may be apparent to those skilled in the art.

The encryption agent 212 can employ one or more functions of an operating system of the user VM 210 such as specific operating system encrypted file-system services or facilities. Alternatively, the encryption agent 212 can be configured to identify and intercept file-system operations such as read, write and file creation operations. This can be achieved, for example, by way of a file system operation interceptor as a software, hardware, firmware or combination component that detects requests for file system operations in respect of data for software executing in the user VM 210. Such a file system operation interceptor can be implemented in a number of ways. For example, a file system operation interceptor can detect operating system application programming interface (API) calls by software such as an application or service executing in the user VM 210 to identify file system operation requests by the software corresponding to file system API invocations. Such detection can be achieved by intercepting a request by the application for a file system operation such as by a software technique known as "hooking".

Hooking is a technique for intercepting function calls, messages or events passed between software components such as a software application executing in the user VM 210 and an operating system file-system API. For example, hooking can be employed at a runtime of the user VM 210 such as by way of facilities and/or services provided by an operating system of the user VM 210 or software associated with the operating system. The paper "Intercepting Arbitrary Functions on Windows, UNIX, and Macintosh OS X Platforms" (Daniel Myers and Adam Bazinet, University of Maryland, 2004) describes a number of techniques for intercepting functions in a variety of operating systems. For example, the Detours library from MICROSOFT provides for the interception of system function calls in order to instrument code or extent operating system functionality (see "Detours: Binary Interception of Win32 Functions", Galen Hunt and Doug Brubacher, Microsoft Research, 1999). Jurrian Bremer also describes techniques for intercepting system calls in his paper "Intercepting System Calls on x86_64 Windows" (2012, www.jbremer.org). Further, the paper "Intercepting System API Calls" (Seung-Woo Kim, Intel, 2004) describes various techniques for function interception and presents a generic method to achieve function interception. Alternative tools and techniques for providing hooking for applications executed by an operating system are described, listed and referenced at www.en.wikipedia.org.

Thus the encryption agent 212 provides WDE of data storage devices of the user VM 210 and accordingly, when a disk image of the user VM 210 is taken, an encrypted disk image. The encryption agent 212 also thus provides, at runtime of the user VM 210, decryption of encrypted data stored to virtual data storage devices of the user VM 210 and encryption of data for storage to the virtual storage devices.

On completion of the encryption of the data storage devices of the user VM 210 the security function 204 is further adapted to perform a VM migration of the user VM 210 to the hypervisor 200 in which the security VM 202 executes. In an alternative embodiment the user VM 210 can be migrated to a different hypervisor outside the security VM 202. In some embodiments, the migration of the user VM 210 is a live migration such that the user VM 210 is moved while operating in a running state to the hypervisor 200. A live migration may retain client connections to the user VM 210, memory state, storage state, network connectivity state, application states and the like such that the user VM 210 continues to execute following the migration with no loss of state. Such live migration can be provided by hypervisors such as VMWARE ESX, VirtualBox, IBM VPAR (with an addition migrator), Xen, OpenVZ, KVM, Oracle VM Server, POWER Hypervisor (PHYP) and others as will be apparent to those skilled in the art. The live migration can alternatively or additionally be achieved by a process of copying a disk image for the user VM 210 to a new user VM 210' instantiated in the hypervisor 200 and maintaining a synchronization of a state of the new virtual machine with a state of the user VM 210. Then, users of the user VM 210 in the security hypervisor 208 can be transitioned to the user VM 210' in the hypervisor 200 and execution of the user VM 210 in the security hypervisor 208 can be ceased such that the user VM 210' constitutes the migrated user VM 210.

In some embodiments the security VM may require special privileges to be able to trigger, execute or undertake the migration of the user VM 210 to the hypervisor 200 such as special privileges in respect of the hypervisor 200 or the security hypervisor 208 to achieve the migration.

Thus, as illustrated in FIG. 2b, the user VM 210 in the security hypervisor 208 is migrated to the hypervisor 200 as user VM 210' including encryption agent 212' such that the data storage devices for the user VM 210' are wholly encrypted which, when stored, recorded or captured as a disk image file, provides a wholly encrypted disk image for the user VM 210'.

FIG. 3 is a flow diagram of a method of providing WDE for a virtualized computer system in accordance with an embodiment of the present disclosure. The method generally involves the security function 204 of the security VM 202, the security hypervisor 208 executing in the security VM 202 and the user VM 210 executing in the security hypervisor 208. Initially, at 302, the security function 204 invokes the security hypervisor 208. At 304 the security function 204 instantiates the user VM 210 from disk image 206. At 306 the security function installs the encryption agent 212 in the user VM 210. At 308 the security agent 212 encrypts the data storage devices of the user VM 210. At 310 the encryption agent 212 provides services to encrypt data written to and decrypt data read from the data storage devices of the user VM 210. Subsequently, at 312, the security function 204 migrates the user VM 210 to the hypervisor 200 as user VM 210'. On completion of the method of FIG. 3 the user VM 210 no longer executes in the security hypervisor 208 on account of the migration and the security hypervisor 208 can be closed. Further, the security VM 202 can be closed. Thus, in this way WDE of data storage devices for a user VM 210 can be provided including encryption of MBR and/or boot partitions so as not to leave unencrypted partitions vulnerable to theft, intrusion, modification and/or attack.

Following provision of the user VM 210' migrated to the hypervisor 200 with encrypted data storage devices, the shutdown, closure, saving or recording of an image of the user VM 210' will result in a new disk image for the user VM 210' that includes the encrypted data storage devices, referred to herein as an encrypted disk image 406. Since the data storage devices of the encrypted disk image 406 are encrypted it is not possible to re-instantiate the user VM 210' from the encrypted disk image 406 using a conventional hypervisor with a bootloader, conventional basic input/output system (BIOS) or the like, since the hypervisor will be unable to decrypt the MBR or boot partition to effect bootstrapping of the user VM 210'. Accordingly embodiments of the present disclosure seek to mitigate these challenges.

Figure 4A:
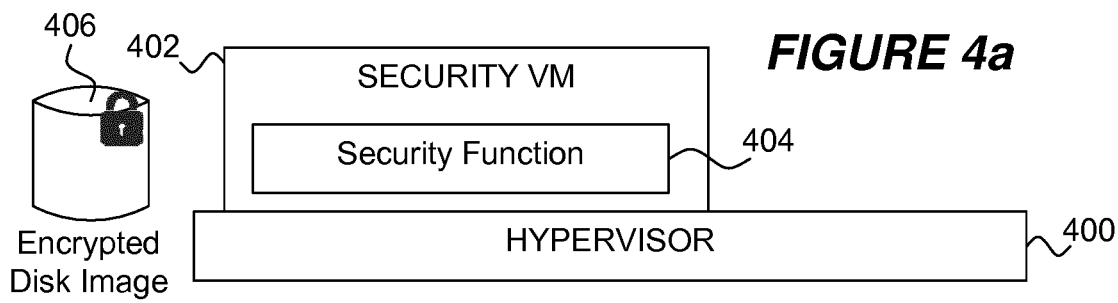
FIGS. 4a, 4b and 4c are schematic illustrations of a security VM for the instantiation of an encrypted disk image in accordance with an embodiment of the present disclosure.
Figure 4B:
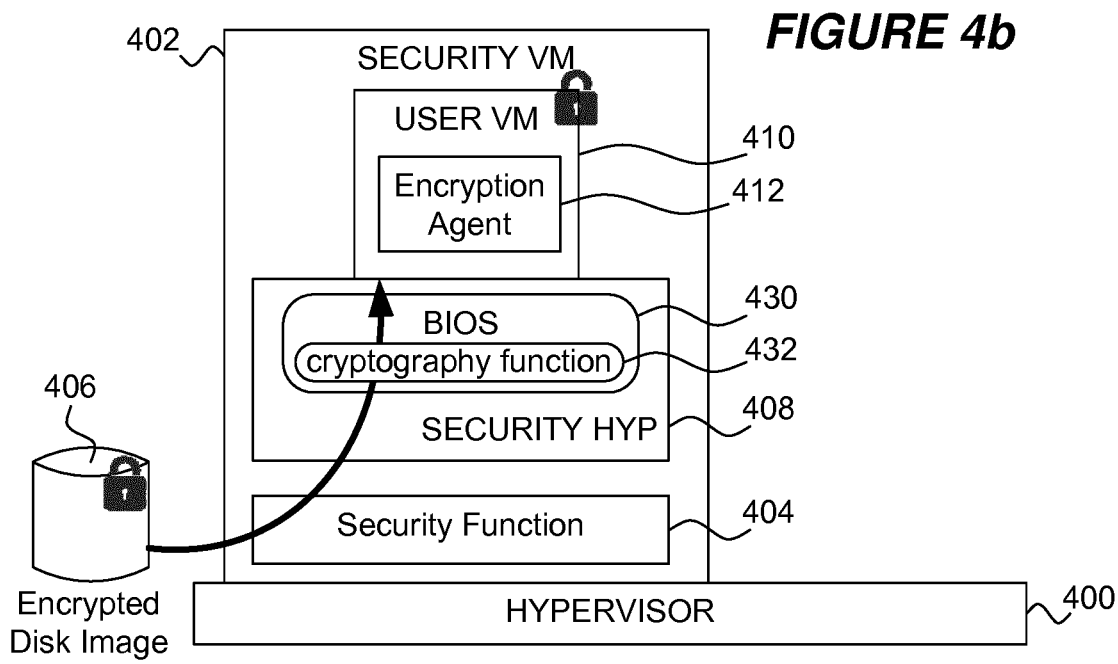
Figure 4C:
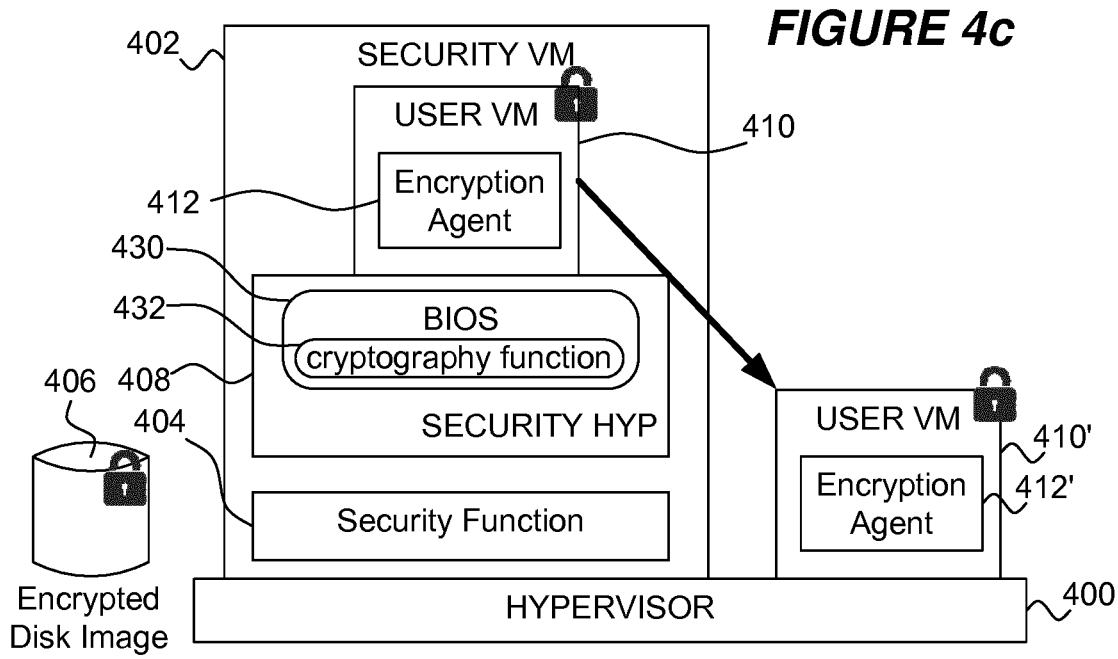

FIGS. 4a, 4b and 4c are schematic illustrations of a security VM 402 for the instantiation of an encrypted disk image 406 in accordance with an embodiment of the present disclosure. The encrypted disk image 406 is a file, stream or data including wholly encrypted virtualized data storage devices for a user VM 410 having an encryption agent 412 substantially as hereinbefore described. The security VM 202 is a VM instantiated to execute on a hypervisor 400, such as a hypervisor hereinbefore described. For example, the security VM 402 is a VM executing in a VMWARE hypervisor, such as a MICROSOFT WINDOWS based VM or a Linux based VM. The security VM 402 includes a security function 404 as a software component providing security services in accordance with an embodiment of the present disclosure. The security function is a software component such as a software service, application, driver, library, script(s) or the like for executing or triggering the execution of a second hypervisor, referred to herein as a security hypervisor 408 for its use in providing security features in accordance with an embodiment of the present invention. As illustrated in FIG. 4b, the security hypervisor 408 is executed within the security VM 402 such as a hypervisor suitable for executing in a windows environment executing in a WINDOWS VM, or other such suitable arrangements as will be apparent to those skilled in the art. The security hypervisor 408 is provided, by the security function 404 or by other means such as by inclusion in a disk image for the security hypervisor 408 from which the security hypervisor 408 was instantiated, a BIOS 430. The BIOS 430 is a logical representation of a facility of a computer system for effecting the bootstrapping or loading of operating system software for the booting of a computer system. In the embodiment of FIGS. 4a to 4c the BIOS 430 is operable to bootstrap an operating system for a VM instantiated in the security hypervisor 408. The BIOS 430 is configured to decrypt and load the encrypted disk image 406 by way of a cryptographic function 432 of the BIOS. The cryptographic function 432 is a software function for decrypting at least part of the encrypted disk image 406 for the purpose of instantiating a VM for the encrypted disk image 406 as user VM 410. The cryptographic function 432 can provide decryption of the encrypted disk image 406 a part at a time such that the entire encrypted disk image 406 is not decrypted at the same time. Preferably the BIOS 430 is provided in a secure manner such that the BIOS and any decrypted part of the encrypted disk image 406 is not vulnerable to theft, attack or intrusion such as by executing the BIOS in a protected portion of the security hypervisor 408 or by securing the security VM 402 from unauthorized access. Thus the BIOS 430 of the security hypervisor 408 permits the decryption and loading of the encrypted disk image 406 to instantiate the user VM 410 in spite of the disk image 406 for the user VM 410 being encrypted, including encrypted MBR or boot partition for the user VM 410. Further, while the BIOS 430 decrypts a part of the encrypted disk image 406 required to boot the user VM 410, such as an encrypted MBR or boot partition, the remainder of the encrypted disk image 406 remains encrypted both before, during and after instantiation of the user VM 410. The user VM 410 includes an encryption agent 412 as hereinbefore described and, accordingly, the user VM 410 executes at runtime with encrypted data storage devices as previously described.

Subsequently, as illustrated in FIG. 4c, the security function 404 effects a migration of the user VM 410 to the hypervisor 400 as user VM 410'. Such a migration can be performed as previously described, including a live migration. Subsequent to the migration any or both of the security hypervisor 408 and the security VM 402 can be terminated or cease operation. The migrated user VM 410' thus executes with wholly encrypted virtualized data storage devices. Subsequent encrypted disk images stored, captured or recorded for the user VM 410' can be re-instantiated using the approach of FIGS. 4a to 4c as described above.

In performing the decryption function the cryptography function 432 receives cryptographic key(s) from, for example, the security function 404. The security function 404 can cooperate with, communicate with or otherwise operate with a source of cryptographic information such as cryptographic keys including symmetric and/or asymmetric keys for the provision of decryption function of the cryptography function 432. For example, in one embodiment the security function 404 communicates with a key management server or the like which may be local or remote to the hypervisor 400. Alternatively the security function or additional software (not shown) can manage cryptographic keys and/or encryption algorithms employed. In a further alternative, the cryptographic function 432 and/or BIOS 430 is/are operable to communicate with a key management server or the like to obtain the required cryptographic resources.

Notably, the security function 404 of FIGS. 4a to 4c and the security function 204 of FIGS. 2a to 2c may be combined into a common security function for providing the functions and services of both.

FIG. 5 is a flow diagram of a method of instantiating an encrypted disk image 406 for a virtualized computer system in accordance with an embodiment of the present disclosure. Initially at 502 the security function 404 of the security VM 402 invokes a security hypervisor 408. At 504 the security function 404 provides a BIOS 430 for the security hypervisor 408 including a cryptography function 432. In an alternative embodiment the BIOS 430 and/or cryptographic function 432 can be provided for the security hypervisor 408 otherwise than by the security function 404 such as by being installed, configured, attached, or otherwise provided for the security hypervisor 408. At 506 the security function 404 loads the encrypted disk image 406 for instantiation as a user VM 410 by the security hypervisor 408. The security hypervisor 408 decrypts and boots the encrypted disk image 406 at 508 so as to instantiate the user VM 410 having encrypted data storage devices therein. At 510 the security function migrates the user VM 410 to hypervisor 400 as user VM 410'. Subsequently operation of either or both the security hypervisor 408 and/or the security function 404 can cease.

Figure 6:
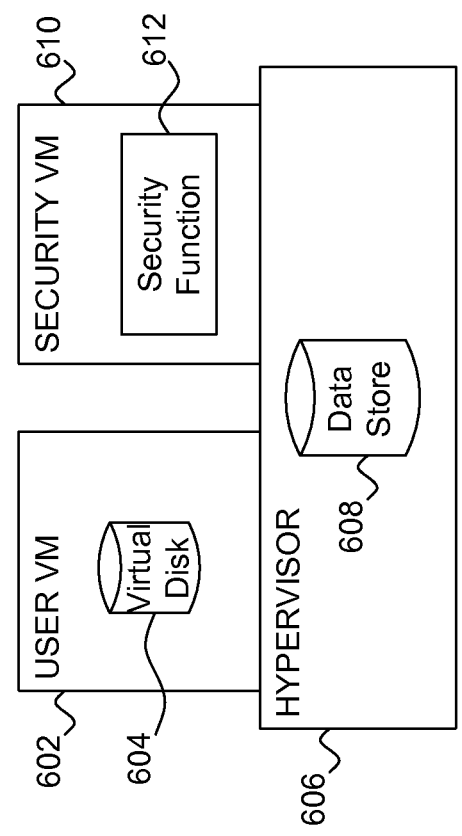
FIG. 6 is a schematic illustration of a security VM in accordance with an embodiment of the present disclosure.

FIG. 6 is a schematic illustration of a security VM 610 in accordance with an embodiment of the present disclosure. The arrangement of FIG. 6 is alternative to the encryption arrangement of FIGS. 2a to 2c. A security VM 610 is provided substantially as hereinbefore described operating in a hypervisor 600. The hypervisor 600 includes a data store 608 accessible to multiple VMs executing in the hypervisor 606, such as a shared data store. The security VM 610 of FIG. 6 includes a security function 612 that is different to the security function previously described in that the security function 612 of FIG. 6 is operable to provide encryption of virtualized data storage disks for a user VM 602. The user VM 602 is a VM instantiated in the hypervisor 606 and including a virtual disk 604. The virtual disk 604 includes one or more partitions, volumes, records, MBRs and the like to provide for an operating system of the user VM 602 to boot and execute. Thus the virtual disk 604 can include an MBR and a primary partition containing operating system software such that a BIOS of the hypervisor 606 is able to instantiate the user VM 602 and boot the operating system for the user VM 602. The security function 612 is adapted to access the user VM using privileged credentials such that the security function 612 is able to access the virtual disk 604 and manage access to the user VM 602 by users and the like. Thus the security function 612 is a privileged function and is preferably kept secure from malicious access, attack and intrusion. Both the user VM 602 and the security VM 610 have access to the data store 608.

The function of the security function 612 in use to provide WDE for user VM 602 will now be described with respect to FIG. 7 which is a flow diagram of a method of providing WDE for a virtualized computer system in accordance with an embodiment of the present disclosure. Initially, at 702, the security function 612 obtains privileged access to the user VM 602. At 704 the security function 612 suspends user access to the user VM 602. At 708 the security function installs, copies or otherwise provides an encryption agent 614 software component in the user VM, the encryption agent 614 being adapted to provide the runtime encryption and decryption functions for read/write operations to a file system of the user VM 602 such as is described above. Notably, the encryption function 614 of FIG. 7 need not be capable of undertaking encryption of an entire data storage device as a whole as was required by the corresponding element described above with respect to FIGS. 2a to 2c but rather encryption agent 614 of FIG. 7 is concerned with the interception, detection or replacement of file-system write and read operations to encrypt data written to data storage devices of the user VM 602 and decrypt data read from data storage devices of user VM 602 so that the user VM 602 can operate at runtime with wholly encrypted data storage devices.

Subsequently, at 710, the security function 612 copies the virtual disk 604 to the shared data store 608 as a duplicate disk. At 712 the security function wholly encrypts the duplicate disk to provide WDE for the disk including encryption of any MBR and/or boot partitions. Thus an encrypted duplicate disk 604' is provided. At 714 the security function 612 prompts, triggers or affects an unmounting 716 of the virtual disk 604 from the user VM 602. The unmount process is essentially a software process in the context of virtualized machines and disk devices as is well known to those skilled in the art. Following the unmount the user VM 602 has no further access to the unencrypted virtual disk 604 which may, depending on a security policy, be discarded. At 718 the security function 612 copies the encrypted duplicate of the virtual disk 604' to the user VM 602 and prompts, triggers or affects a mounting 718 of the encrypted disk 604' so that the user VM 602 can access it via the cryptographic functionality of the encryption agent 614. Subsequently the security function may terminate at 724 or, alternatively, the security function may be retained for performance of similar functionality in respect of other user virtual machines.

Thus in this way encryption of a whole disk including MBR and/or boot partitions can be achieved for virtualized computer systems providing encryption at runtime and encryption at rest without unencrypted portions of disks so mitigating the security risks associated therewith.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the invention is not limited thereto and that there are many possible variations and modifications which fall within the scope of the claims.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method of providing whole disk encryption for a virtualized computer system comprising:
providing a software component executing in a first virtual machine for instantiation in a first hypervisor, the software component invoking a second hypervisor within the first virtual machine for instantiating a disk image of the virtualized computer system as a second virtual machine, and the software component being configured to install a software agent in the second virtual machine, the software agent being adapted to:
encrypt the instantiated disk image;
encrypt data written, by the second virtual machine, to the instantiated disk image at a runtime of the second virtual machine; and
decrypt data read, by the second virtual machine, from the instantiated disk image at a runtime of the second virtual machine,
wherein the software component is configured to migrate the second virtual machine at a runtime of the second virtual machine to the first hypervisor so as to provide a wholly encrypted disk image for the second virtual machine executing in the first hypervisor.

2. The method of claim 1, wherein the software component is further configured to access one or more cryptographic keys for encryption and decryption from a key management server and to provide the one or more cryptographic keys to the software agent.

3. The method of claim 1, wherein the migration is a live migration such that the second virtual machine transfers from executing in the second hypervisor to executing in the first hypervisor with continuing operation for users of the second virtual machine.

4. The method of claim 3, wherein the second virtual machine executing in the second hypervisor is a source virtual machine and the live migration includes:
copying a disk image for the source virtual machine to a new virtual machine instantiated in the first hypervisor as a target virtual machine;
maintaining a synchronization of a state of the target virtual machine with a state of the source virtual machine;
transitioning users of the source virtual machine to the target virtual machine; and
ceasing execution of the source virtual machine such that the target virtual machine constitutes the second virtual machine migrated to the first hypervisor.

5. The method of claim 1, further comprising:
terminating the second hypervisor on completion of the migration.

6. The method of claim 1, further comprising:
terminating the first virtual machine on completion of the migration.

7. A data processing system to provide whole disk encryption for a virtualized computer system, the data processing system comprising:
a processor and a data store, wherein the processor is adapted to:
provide a software component executing in a first virtual machine for instantiation in a first hypervisor, the software component invoking a second hypervisor within the first virtual machine for instantiating a disk image of the virtualized computer system as a second virtual machine, and the software component being configured to install a software agent in the second virtual machine, the software agent being adapted to:
encrypt the instantiated disk image;
encrypt data written, by the second virtual machine, to the instantiated disk image at a runtime of the second virtual machine; and
decrypt data read, by the second virtual machine, from the instantiated disk image at a runtime of the second virtual machine,
wherein the software component is configured to migrate the second virtual machine at a runtime of the second virtual machine to the first hypervisor so as to provide a wholly encrypted disk image for the second virtual machine executing in the first hypervisor.

8. A non-transitory computer-readable storage element storing a computer program comprising computer program code to, when loaded into a computer system and executed thereon, cause the computer to perform the method as claimed in claim 1.

* * * * *